United States Patent [19]

Leonard

[11] Patent Number: 5,291,988
[45] Date of Patent: Mar. 8, 1994

[54] ADJUSTABLE GUIDE RAIL APPARATUS FOR CONVEYOR SYSTEMS

[76] Inventor: George E. Leonard, 8972 Wells Ferry Rd., Bettendorf, Iowa 52722

[21] Appl. No.: 110,669

[22] Filed: Aug. 23, 1993

[51] Int. Cl.$^5$ .............................................. B65G 21/20
[52] U.S. Cl. ................................................... 198/836.3
[58] Field of Search ........................... 198/836.1, 836.3

[56] References Cited

U.S. PATENT DOCUMENTS

| | | | |
|---|---|---|---|
| 1,824,228 | 9/1931 | Perry | 198/836.3 X |
| 1,877,334 | 9/1932 | Lathrop | 198/836.3 |
| 2,156,020 | 4/1939 | Lathrop | 198/836.3 |
| 2,229,605 | 1/1941 | Snyder | 198/836.3 |
| 2,670,838 | 3/1954 | Carter | 198/836.3 |
| 3,554,353 | 1/1971 | Raudat | 198/836.3 |
| 4,932,517 | 6/1990 | Johnson | 198/836.3 X |
| 5,211,280 | 5/1993 | Houde | 198/836.3 |

*Primary Examiner*—D. Glenn Dayoan
*Assistant Examiner*—James R. Bidwell
*Attorney, Agent, or Firm*—Henderson & Sturm

[57] ABSTRACT

The present invention describes a novel apparatus for adjusting the lateral spacing between conveyor system guide rails so as to accommodate articles of various sizes. The invention utilizes a series of guide rail mounts which are moved laterally by an internal cam mechanism. The cams are rotated by a drive shaft that runs parallel to the conveyor and is rotatably mounted in a series of bearing assemblies secured adjacent to the conveyor. The drive shaft may be rotated by way of a simple hand wrench, which simultaneously shifts all of the guide rail mounts an equal distance, thus maintaining their parallel configuration. The shaft is then locked in position, thereby fixing the position of the guide rails until further adjustment is desired. The invention may be used on curved conveyor systems as well as straight systems.

2 Claims, 4 Drawing Sheets

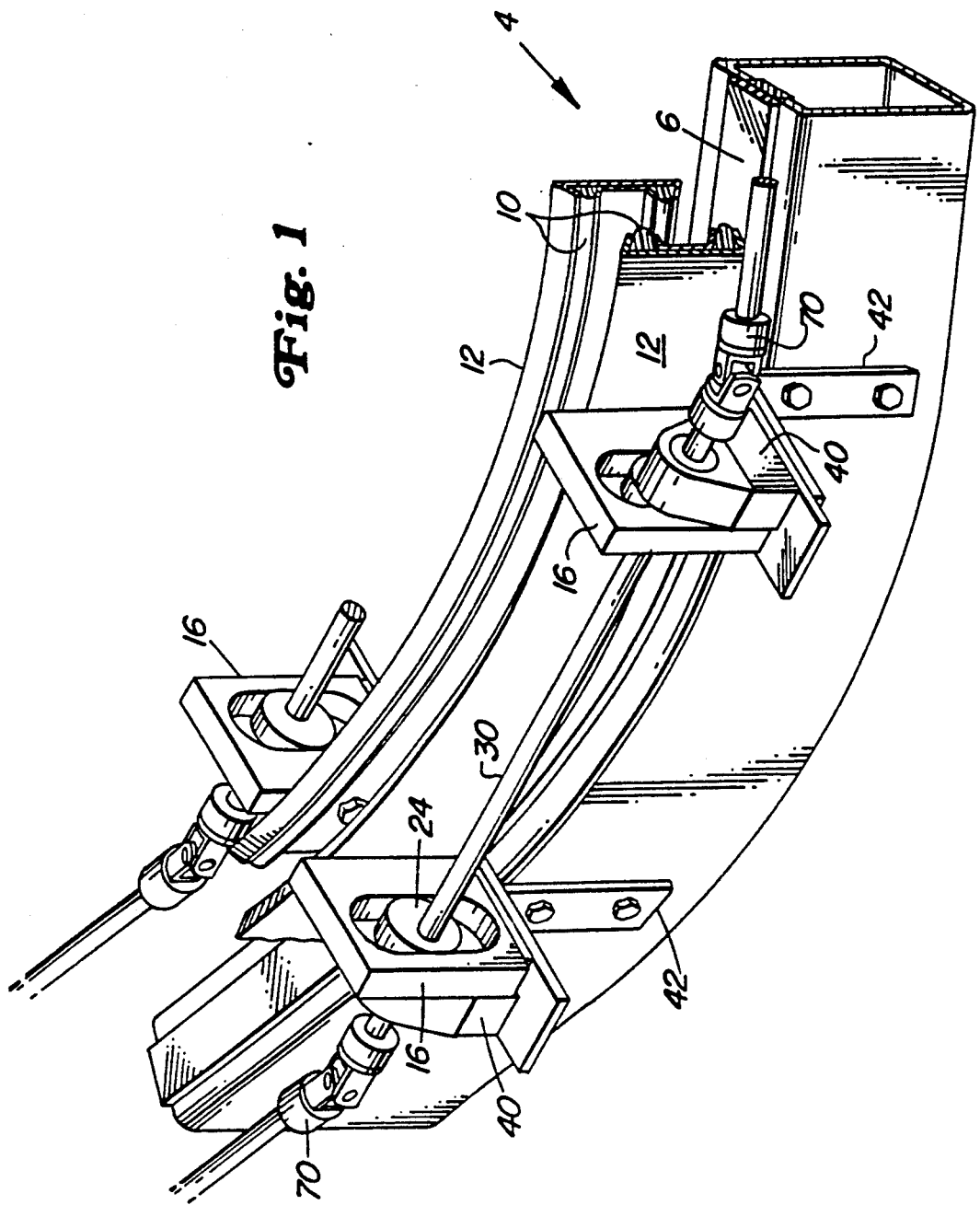

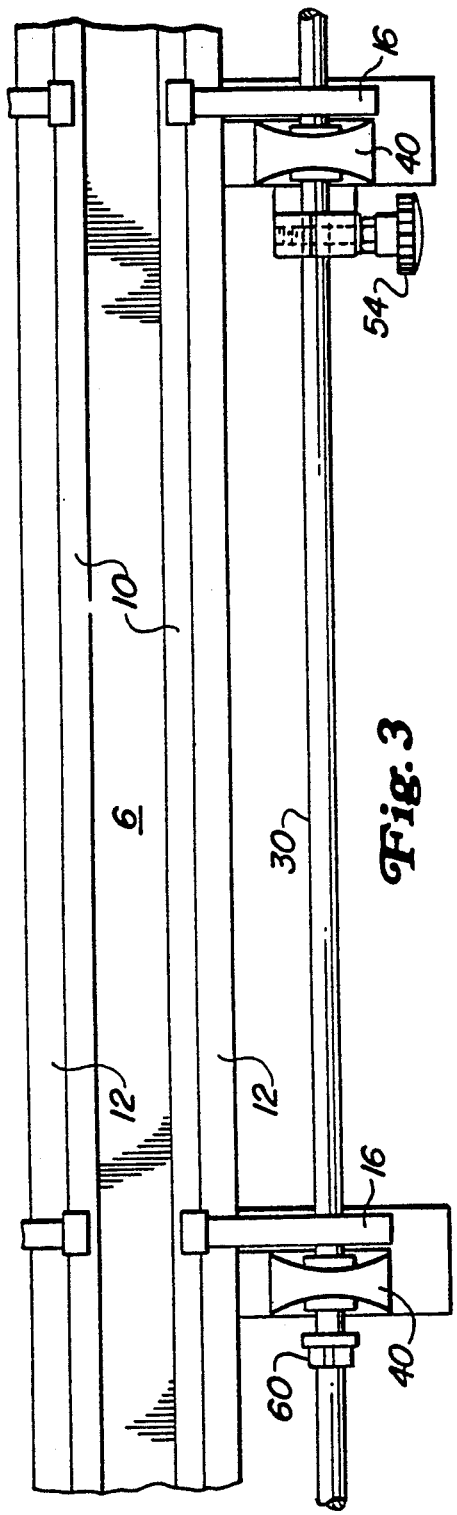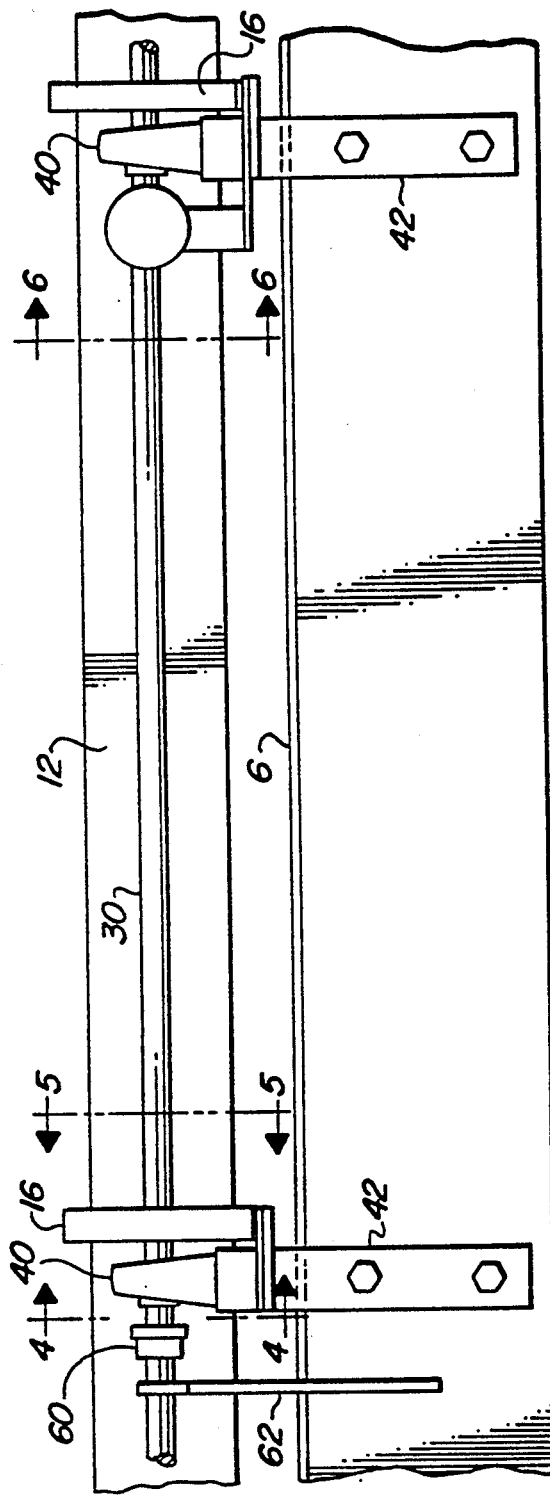

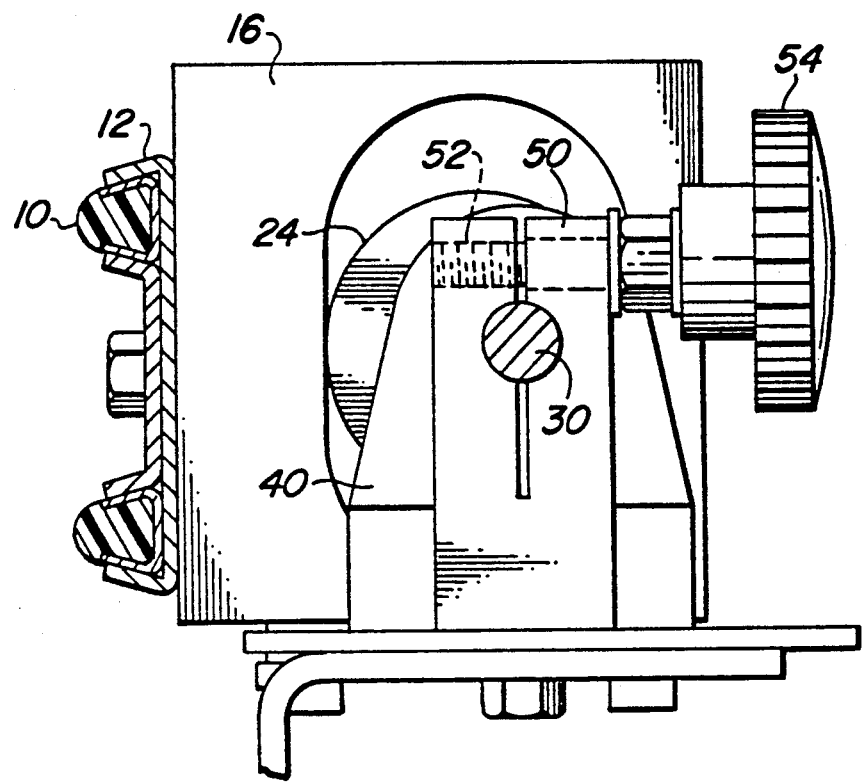

ADJUSTABLE GUIDE RAIL APPARATUS FOR CONVEYOR SYSTEMS

TECHNICAL FIELD

This invention relates to guide rails for conveyor systems, and more particularly to guide rails which may be quickly and easily adjusted laterally so as to accommodate articles of various sizes to be conveyed through the system.

BACKGROUND ART

It is well known in the conveyor system art to provide guide rails positioned on opposite sides and along the length of a conveyor system to provide support for the articles traveling upon the conveyor. When the conveyor system is to be utilized for articles of a different size, it then becomes necessary to adjust the lateral position of these guide rails to provide an increased or a decreased lateral spacing between the guide rails. In most systems in use today, the guide rails are supported by a plurality of longitudinally spaced brackets fixed along the length of the conveyor system. When the guide rail spacing is to be adjusted, each of the brackets must be loosened and then repositioned. Not only is this a very time consuming procedure, but it is also quite difficult to reset the guide rails such that they are parallel with each other. Various mechanical systems have been developed to attempt to overcome some of these problems, but these have met with limited success. Lathrop, U.S. Pat. No. 2,156,020, teaches a conveyor apparatus for articles of varying dimensions, but the device is adapted for use with only a single guide rail, and further is extremely complex. Perry, U.S. Pat. No. 1,824,228, is suitable for use with multiple rails, but is also an extremely complex system. Snyder et al, U.S. Pat. No. 2,229,605, while also suitable for use with multiple rail systems, is limited to straight line conveyors and cannot be adapted for use with curved conveyor systems.

DISCLOSURE OF THE INVENTION

The present invention teaches an apparatus for laterally adjusting the guide rails of a conveyor system so the system is capable of accommodating articles of various sizes. The guide rails are secured to a series of mounts which may be moved laterally by an internal cam mechanism. The cam mechanism is rotated by a drive shaft that runs parallel to the conveyor system through a series of bearing assemblies attached adjacent to the conveyor. A simple hand crank affixed to the drive shaft is used to rotate the shaft, and hence the cams, which thereby simultaneously shift all of the guide rails into the desired position while maintaining their parallel orientation. The shaft is then locked into position by means of a simple shaft clamp until further adjustments become necessary. The invention is suitable for curved as well as straight line conveyor systems.

BRIEF DESCRIPTION OF THE DRAWINGS

FIG. 1 is a perspective view of a representative part of a conveyor system incorporating the present invention;

FIG. 2 is an elevational view of a representative part of a conveyor system incorporating the present invention; and FIG. 3 is an plan view of a representative part of a conveyor system incorporating the present invention;

FIG. 6 is a partial cross-sectional view taken along line 6—6 of FIG. 2.

BEST MODE FOR CARRYING OUT THE INVENTION

Figure 5:
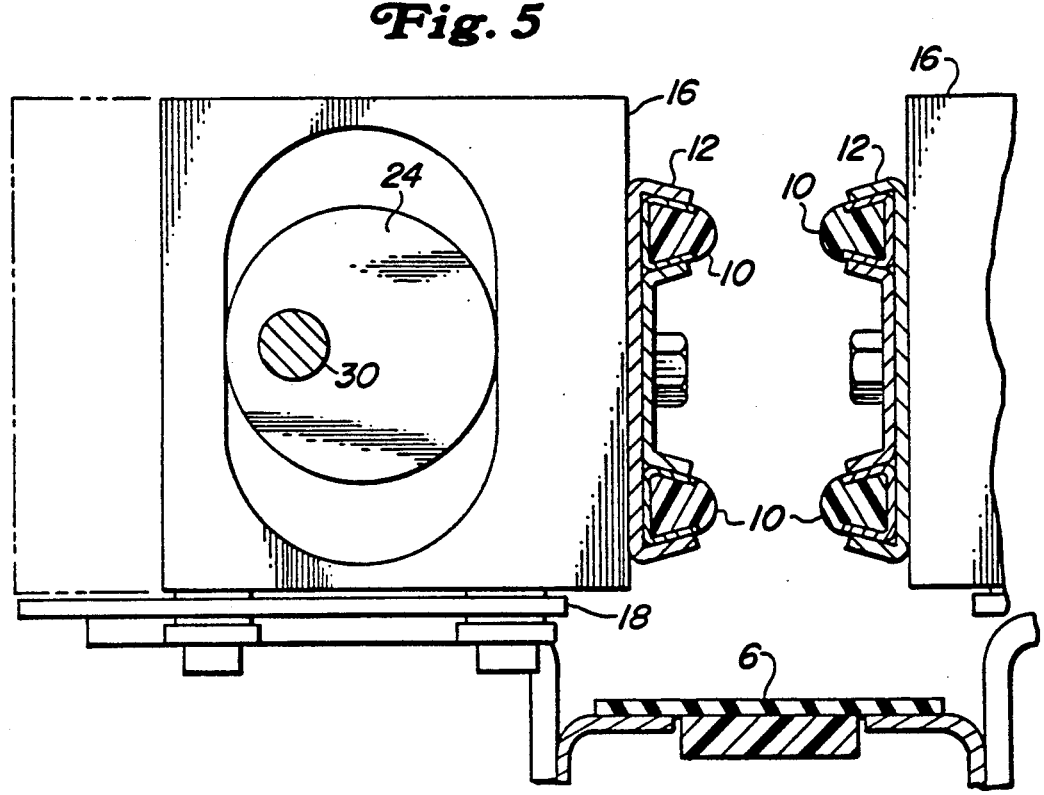
FIG. 5 is a partial cross-sectional view taken along line 5—5 of FIG. 2.

Referring now to the drawings, wherein like reference numerals designate identical or corresponding parts throughout the several views, the present invention is seen affixed to a conventional conveyor system 4, which provides for a moving surface 6 capable of transporting various sized articles along its length for any of a series of operations to be performed thereon. Typical would be the conveyance of beverage bottles for filling, capping and labeling.

Figure 4:
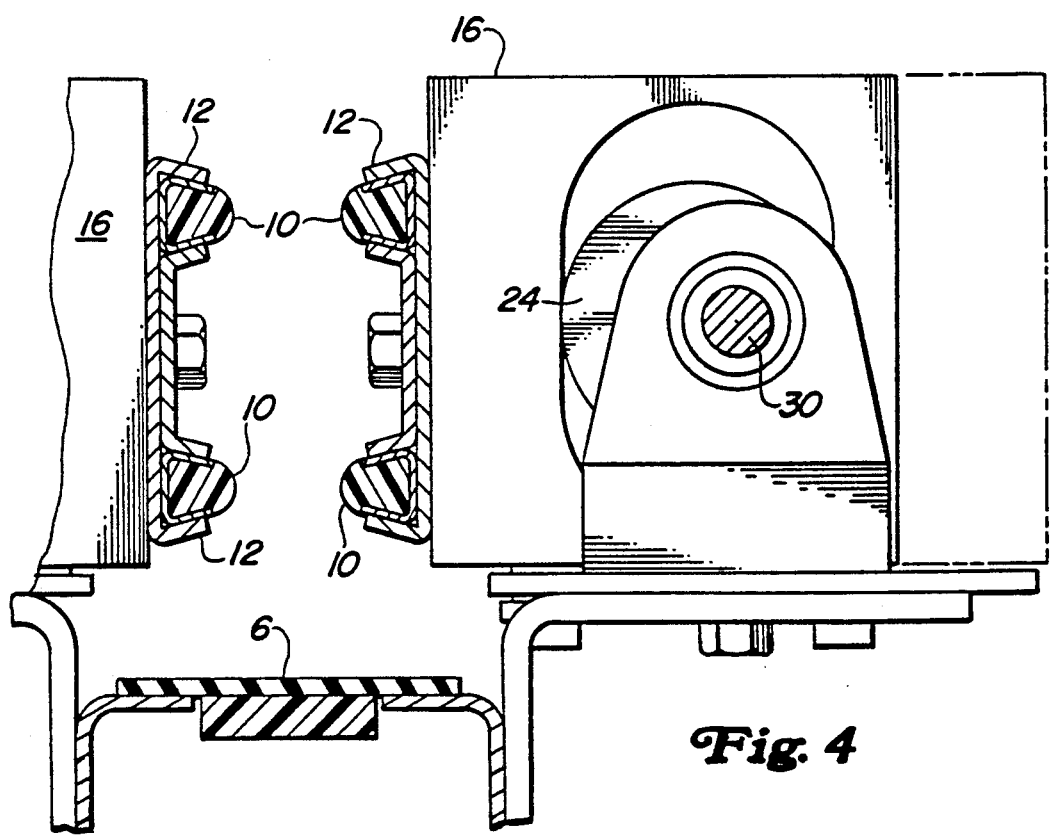
FIG. 4 is a partial cross-sectional view taken along line 4—4 of FIG. 2.

A plurality of horizontal guide rails 10 are arranged above the conveyor belt 6 so as to guide articles along the conveyor belt. A pair of dual guide rails is depicted in the Figures, but various combinations of rail assemblies 12 may be utilized with the invention such as single guide rails or triple guide rails. As best seen in FIG. 4 and FIG. 5, the rail assemblies 12 are secured to cam cages 16, which are in turn slidably mounted upon thrust bearings 18, thereby permitting lateral motion of the cam cages 16 relative to the conveyor system. A cam 24 is positioned within the cam cage 16 and is secured to a drive shaft 30 whereby rotation of the drive shaft 30 induces rotation of the cam 24 within the cam cage 16, resulting in lateral motion of the cam cage 16 and attached guide rail assemblies 12.

The drive shaft 30 is supported along its length by a plurality of bearings 40, which may be secured to the conveyor system by angle brackets 42. In order to secure the guide rails in a given position, the drive shaft 30 may be locked to prevent rotation by means of drive shaft clamp 50, best seen in FIG. 6, which is secured adjacent a bearing 40. The drive shaft 30 passes through an aperture in the drive shaft clamp 50, the clamp and aperture being split so that the diameter of the aperture may be adjusted by means of clamp screw 52 driven by clamp knob 54. When the lateral spacing of the guide rails is to be adjusted, the drive shaft clamp 50 is loosened so as to permit rotation of the drive shaft 30. After the guide rails have been properly positioned, the clamp knob 54 is rotated, driving clamp screw 52 and clamping the drive shaft clamp 50 upon the drive shaft 30 so as to prevent its rotation.

While the drive shaft 30 may of course be rotated by means of a simple pipe wrench, in the preferred embodiment a drive nut 60 is keyed to the drive shaft. A box end wrench 62 may be positioned over the drive shaft adjacent the drive nut 60 so as to provide a convenient means of shaft rotation and hence rail movement.

As seen in FIG. 1, the present invention is particularly well adapted for use on curved conveyor systems wherein a universal-type joint 70 may be spliced within the drive shaft at one or more points as required depending on the degree of curvature to be accommodated.

While the invention has been described with a certain degree of particularity, it is manifest that many changes may be made in the details of construction and the arrangement of components without departing from the spirit and scope of the disclosure. It is to be understood that the invention is not limited to the embodiments set forth herein for purposes of exemplification, but is to be limited only by the scope of the appended claims including the full range of equivalency to which each element thereof is entitled.

I claim:

1. An adjustable guide rail apparatus for conveyor systems, comprising:
   (a) guide rails for guiding items along the conveyor, said guide rails being disposed in a laterally spaced relationship and extending longitudinally of the conveyor;
   (b) cam cages supporting said guide rails at longitudinally spaced intervals and slidably mounted adjacent the conveyor, said cam cages capable of lateral movement relative to the conveyor;
   (c) cams rotatably mounted within said cam cages so as to cause lateral movement of said cam cages relative to the conveyor;
   (d) a drive shaft extending longitudinally of the conveyor and passing through said cams and fixed thereto;
   (e) bearing assemblies rotatably supporting said drive shaft at longitudinally spaced intervals adjacent the conveyor;
   (f) drive means for rotating said drive shaft; and
   (g) locking means for selectively preventing rotation of said drive shaft.

2. An adjustable guide rail apparatus as recited in claim 1, further comprising a universal-type joint for said drive shaft.

* * * * *